April 30, 1963     E. G. ANGER     3,088,064

ELECTRIC CONTROL CIRCUITS

Original Filed Oct. 1, 1957

INVENTOR.
ERNEST G. ANGER
BY

3,088,064
ELECTRIC CONTROL CIRCUITS
Ernest G. Anger, Wauwatosa, Wis., assignor to Square D Company, Detroit, Mich., a corporation of Michigan
Continuation of application Ser. No. 687,533, Oct. 1, 1957
This application June 6, 1960, Ser. No. 34,198
7 Claims. (Cl. 320—1)

This invention relates to electric control circuits and more particularly to a transistorized circuit which will delay the response of a control circuit and is a continuation of application Serial No. 687,553, filed October 1, 1957, now abandoned.

The present invention is directed to a transistorized time delay circuit which will delay the immediate response of a D.C. motor controller to changes in the speed setting of the controller. While various systems such as disclosed in Patent No. 2,902,634 or in Patent No. 2,786,975, which has been assigned to the assignee of the present invention, have proved satisfactory in use, the transistorized circuit according to the present invention will provide an improved time rate delay with fewer components than the circuits heretofore known. More particularly, the circuit according to the present invention will operate on low voltages and with this low voltage will provide an almost perfect time rate delay for the motor speed controller. Further, the transistors which are used in the time rate delay circuit will not only operate efficiently with the low voltages but will function as diodes to freely pass current in one direction with a minimum voltage drop and will act as current amplifiers when controlling current flow in the opposite direction. This result is not possible with any of the time rate delay circuits now known.

It is an object therefore of the present invention to provide an efficient time rate delay circuit for a D.C. motor speed controller which will operate on relatively low voltages and will amplify the changes in speed settings for the motor.

A further object of the present invention is to utilize a transistorized time rate delay circuit which will retard the response of a D.C. motor controller during both acceleration and deceleration of the motor.

Another object of the present invention is to control the charging and discharging of a capacitor which is connected to delay the response of a D.C. motor controller with a circuit which will charge the capacitor by a constant current at a substantially low voltage irrespective of the variations in the charging voltage.

A further object of the present invention is to supply the emitters of a pair of transistors in a time rate delay circuit with substantially constant current from a simple low voltage floating source and to control the emitter current with smaller signal currents so as to utilize the transistors as diodes and current amplifiers in the circuit.

Further objects and features of the invention will be readily apparent to those skilled in the art from the specification and appended drawings illustrating a preferred embodiment in which.

Figure 1:
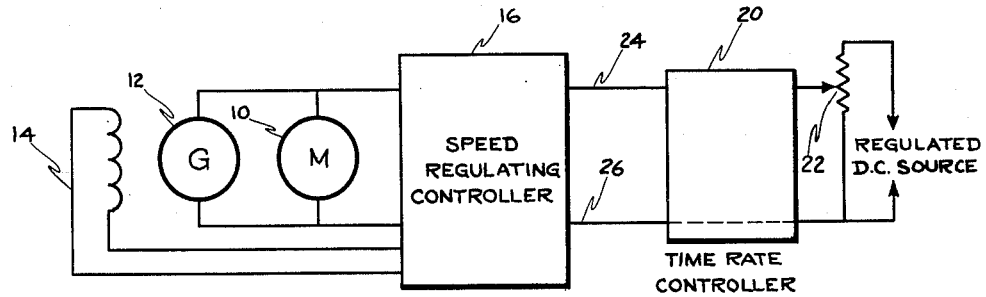
FIG. 1 shows schematically a D.C. motor speed controller as utilizing the time rate delay device according to the present invention.

In the drawings, and in FIG. 1 particularly, a control system for regulating the speed of a motor 10 is shown wherein the motor 10 is energized by a D.C. generator 12 which is rotated by a suitable device such as an A.C. motor, not shown. The excitation of the generator field 14 is controlled by a speed regulating controller 16 to control the output of the generator 12 and thereby control the speed of the motor 10 in the conventional manner.

The present invention is directed to a time rate device 20 for controlling the acceleration and deceleration of the motor 10 and as shown is connected between an output slider 22 of the speed setting potentiometer and a pair of input leads 24 and 26 to the controller 16. A voltage signal is supplied from the time rate controller 20 over leads 24 to 26 to the speed regulating controller 16. The motor also supplies the speed regulating controller 16 with a voltage signal proportional to the motor speed. The speed regulating controller algebraically adds the voltage signals and uses the resultant thereof to control the generator field 14. In normal continuous operation, that is, when the motor 10 is operating at a speed determined by the setting of the slider 22 on the potentiometer, the time rate delay device 20 furnishes a through connection with minimum possible voltage drop and operates as a closed switch contact so the regulated motor speed will properly respond to the setting of the slider 22 on the potentiometer. When the setting of the slider 22 is suddenly moved to increase or decrease the speed of the motor 10, or the contacts of the starting switch are actuated to start the motor, the device 20 will provide the controller 16 with a signal changing at a controlled rate until the speed of the motor corresponds to the setting of the slider 22.

Figure 2:
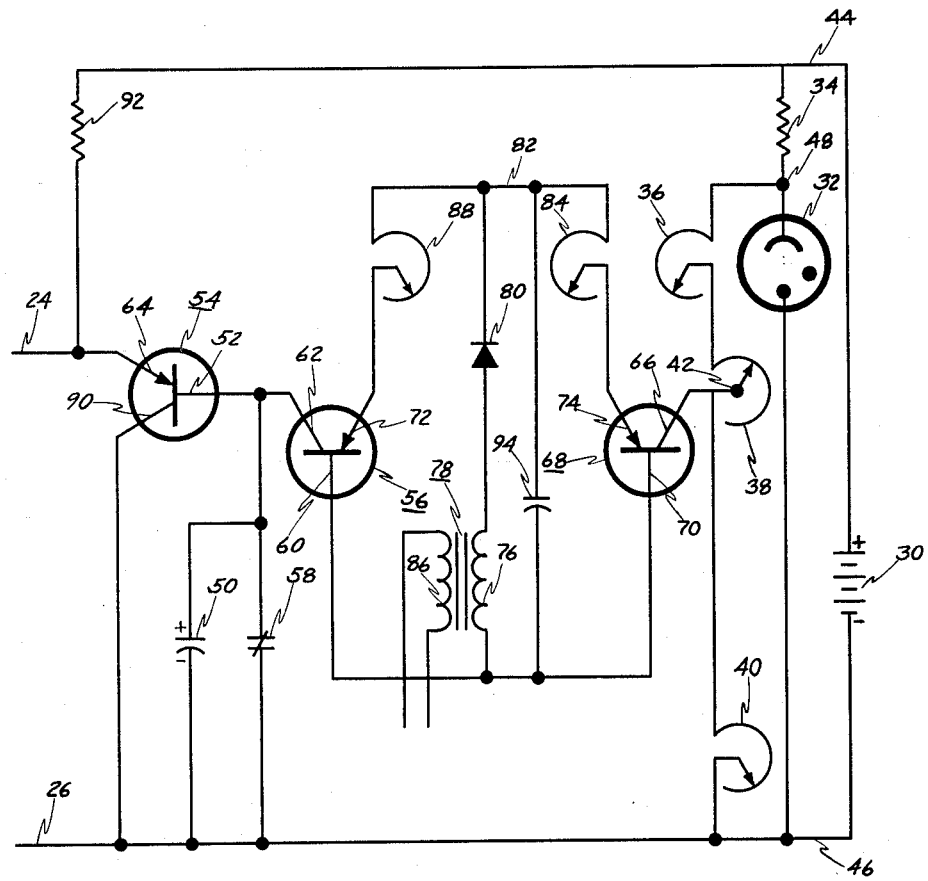
FIG. 2 shows a circuit diagram of a time rate delay device according to the present invention as used in the circuit in FIG. 1.

Typical time rate acceleration controllers are usually arranged to provide adjustable acceleration and deceleration delays which are adjustable to vary the change over intervals which vary from 2 to 20 seconds. It is to be appreciated that one of the requirements of a time rate device is that its timing must be linear and provide a constant rate of change in motor speed over the preselected time interval setting of the device. A device which will accomplish this result is shown in FIG. 2 of the drawings. Before a discussion of the operation of the circuit in FIG. 2 is undertaken, it is believed that a discussion of some of the characteristics of the transistors utilized in the circuit may be of aid in understanding the operation and advantages of the circuits shown. It is well known that a transistor is a constant current conducting device and may be connected to act as a common base connected amplifier wherein the input signal is introduced into the emitter-base circuit and the output signal is extracted from the collector-base circuit and the base electrode is common to the input and output circuit. That is, for constant transistor emitter currents, when the base is controlling the conduction of current through the collector, the collector will have a substantially constant output current regardless of the collector to base voltage. Another characteristic of a transistor is that when the voltage bias between the collector and base becomes a value slightly less than zero, the transistor will become sharply non-conductive. Further reversal of the bias between the collector and base will cause the transistor to conduct strongly as a diode in the reverse direction. Another feature of interest in the transistors used is that they will act as amplifiers. That is, a small change in the emitter to base current will result in a large change in collector current flow.

Considering the circuit shown in FIG. 2 of the drawings, a battery 30, a voltage regulating tube 32, a fixed resistance 34 and three variable potentiometer resistances 36, 38, and 40 comprise the D.C. regulated voltage source corresponding to the potentiometer in FIG. 1 wherein the variable tap 42 on potentiometer 38 is analogous to the slider 22. It is clearly apparent the battery 30, which represents a D.C. source, may be replaced by an A.C. transformer and bridge type rectifier combination with suitable filter networks to provide a D.C. voltage between leads 44 and 46 which voltage is made constant by the glow tube 32 which is a regulating tube and connected to provide a constant voltage between junction 48 and lead 46. The potentiometers 36 and 40 are included to respectively adjust the maximum and minimum speeds of motor 10.

The circuit shown in FIG. 2 includes a capacitor 50 which is used in the circuit to delay the change in potential of a base 52 of a transistor 54. The capacitor 50 preferably is of the commercially available tantalum electrolytic type having a capacitance of approximately 80 mfd. These capacitors have a lower leakage than the more commonly known aluminum foil electrolytics. When capacitors of the type indicated are employed, higher charging currents than outlined in application Serial Number 687,635, now Patent 2,929,980, concurrently filed herewith may be employed. The relatively high capacity and low leakage of this capacitor, if desired, may be used to justify the omission of the temperature compensation means which is clearly shown in the application. It is clearly apparent that if extremely accurate time rate delays are desired the temperature compensation may be included in the circuit shown in the present application.

In the circuit shown in FIG. 2, a transistor 56 controls the constant current charging of the timing capacitor 50 during acceleration of the motor 10. Before the starting switch, not shown, is closed, a closed switch 58 will provide a discharge path for capacitor 50. During motor operation the switch 58 is open and the motor 10 will accelerate when the starter switch is initially actuated or the slider 42 on potentiometer 38 is moved upwardly to increase the speed setting of the motor. This change of the slider 42 position will produce a positive voltage rise of base 60 relative to collector 62 of transistor 56. The reference voltage signal source in turn provides a voltage signal from the slider 42 to the collector 66 of transistor 68. When the slider 42 is moved upwardly to increase the motor speed, the collector 66 will become positive to the base 70 and the transistor acts as a diode to pass current from the collector to base with a low voltage drop characteristic of reverse conduction through a transistor. This reverse conduction of transistor 68 will cause the base 60 of transistor 56 to become positive relative to the collector 62 and cause the collector 62 to pass a current which is almost exactly equal to the current applied to the emitter 72 regardless of the collector 62 to base 60 voltage to charge the capacitor 50 at a constant rate. The value of the current to the emitter 72, which in turn will determine the rate of charge of capacitor 50, is adjustable by means of the variable resistance of potentiometer 88. In order to explain the charging path for the capacitor 50 during acceleration it may be said that the current flow from one plate of the capacitor passes through the slider 42 and from the collector 66 to base 70 and then through the secondary winding 76, diode 80 and potentiometer 88 to the emitter 72 and collector 62 to the other plate of capacitor 50. In this connection it is to be noted that the current from transformer winding 76 provides the charging current and appears as a constant current through emitter 72.

Thus it will be seen that the potentiometer 38 serves as a source of voltage for controlling the charging capacitor 50 when the slider 42 is moved upwardly to cause the motor to accelerate. When the slider is moved downwardly, the reference signal supplied to collector 62 is more positive than the signal supplied by slider 42. When the collector 62 is more positive than base 60, the transistor 56 acts as a diode and conducts current in the reverse direction with the characteristic low voltage drop. The transistor 68 is connected in a symmetrically oppositely fashion to transistor 60. When the collector 62 is more positive than the base 60, the capacitor discharges through the circuit causing the base 70 of transistor 68 to become positive relative to the collector 66 which had its potential decreased when the slider 42 was moved downwardly. This will cause an increase in the current through collector 66. The discharging current for capacitor 50 which flows through base 60 is passed through the emitter 74 through a circuit which includes the secondary winding 76 of transformer 78, the diode 80, the lead 82 and the deceleration potentiometer 84. This circuit will permit the charge on the capacitor 50 to be reduced in a controlled rate as dictated by the resistance value of the potentiometer 84.

The transformer 78 which is energized through its primary winding 86 from a suitable alternating source not shown, provides a substantially constant current at a low D.C. voltage to the emitters 72 and 74 through the diode 80. The value of this emitter current can be varied by potentiometers 84 and 88 to provide an arrangement whereby the time rate action during deceleration or acceleration of the motor 10 can be varied selectively. During acceleration, that is, when the time rate capacitor 50 is charging, the base 52 is rendered increasingly positive relative to the collector 90 and the transistor 54 decreases its conduction. This action of transistor 54 is well known and is a consequence of its connection in conventional emitter follower arrangement whereby the decreasing current drawn by the resistor 92 is provided by decrease of collector conduction without appreciable current flow from capacitor 50. When the capacitor 50 is discharging, during deceleration, the base 52 is rendered increasingly negative relative to collector 90 and the conduction of transistor 54 is increased. The time rate action of capacitor 50 in either charging or discharging direction terminates sharply as soon as the voltage of the timing capacitor 50 equals the potential at slider 42. When this occurs, the time rate circuit shown continues to conduct only the minute value of current to base 52 to maintain the steady state output voltage regulation. Further, it is clearly apparent that the transistor 54 migh be connected to a second transistor in a conventional cathode emitter follower amplifier arrangement to further amplify the delay time rate signal change of the slider 42. The motor speed regulating controller 16 as shown may be either voltage or current sensitive device such as shown in Patent 2,902,634 or Patent 2,786,975 mentioned supra and the incorporation of the time delay circuit 20 according to the present invention will be clearly apparent and may be accomplished as follows: in Patent 2,902,634 a reference voltage source comprising a potentiometer resistance is indicated by a numeral 14. An error voltage signal proportional to the speed of the motor to be regulated is provided by a potentiometer which is indicated by a numeral 15. Connected in circuit between the potentiometers 14 and 15 is a time rate controller which delays any change in the reference voltage signal from potentiometer 14 to a capacitor 18. The capacitor thus acts as an artificial reference voltage signal and reflects, after a predetermined interval, changes which have been made in the setting of potentiometer 14. The voltage potentials across the capacitor 18 and the potentiometer 15 are impressed across an error detector which is shown as a bias control winding 17 of a magnetic amplifier. The winding 17 is connected in series wtih the capacitor 18 and the potentiometer 15.

When the time rate controller 20 according to the present invention is included in the circuit shown in Patent 2,902,634, it replaces the time rate controller as disclosed in the patent. The slider 42 corresponds to the slider on potentiometer 14 and the capacitor 50 corresponds to the capacitor 18 of the patent. In the circuit shown in FIG. 2, the transistor 54 acts as a current amplifier and amplifies the voltage changes appearing across capacitor 50 to cause the voltage changes to appear as amplified current changes across leads 24 and 26. Thus when the circuit shown in FIG. 2 is connected to the controller shown in Patent 2,902,634, the emitter 64, the collector 90 will be connected in a series circuit which includes the bias winding 17 and the potentiometer 15 of the patent.

The capacitor 94 is included to filter the undesirable rectifier ripple voltage in the circuit which includes the transformer winding 76 and the diode 80. From the above it is apparent that the transistors 56 and 68 operate under constant emitter currents which are supplied from winding 76 and controlled by potentiometers 88 and 84. When the transistors are operated with constant emitter currents, the small changes in voltage signals in the bases thereof will be amplified and appear as constant current to the collectors of the respective transistors which collector current is independent of the potential between the collectors and the bases. This constant current is used to charge or discharge the capacitor 50 at a constant rate which rate terminates sharply when the potential between the collectors and the bases becomes equal. This characteristic of the transistor is utilized to an advantage in the instant application to provide a linear charging rate for the time rate capacitor so that the changes in speed of the motor will be constant until the desired speed setting of the motor is accomplished.

In the description and drawings of the circuit it will be noted that certain conventional elements such as circuit limiting resistances, by-pass surge capacitors, etc., have been omitted to simplify the explanation of the circuit and its operation. These elements are well known to those skilled in the art and the value of such components and descriptions will be obvious.

While certain preferred embodiments of the invention have been specifically disclosed, it is understood that the invention is not limited thereto, as many variations will be readily apparent to those skilled in the art and the invention is to be given its broadest possible interpretation within the following claims.

What is claimed is:

1. An adjustable reference voltage unit having predetermined rates of voltage change, comprising; an adjustable constant voltage source providing an input voltage signal for the unit, a capacitor providing an output reference voltage signal for the unit, a pair of transistors having common base connected electrodes, and each having an emitter and a collector electrode, a separate direct current source connected between the emitter electrodes and bases of said transistors to provide the emitter electrodes with constant currents, and means connecting the input voltage signal source and the output signal source respectively to the collector eletcrodes of the transistors in a circuit for charging and discharging the capacitor at a rate determined by the current flow through the emitters in response to changes in the input voltage signal.

2. An adjustable reference voltage unit having predetermined rates of voltage change comprising; an adjustable voltage reference source providing an input for the unit, a capacitor for providing a timed output reference voltage signal, a pair of common base connected transistors each having an emitter and base with the bases thereof connected together, a separate direct current source connected between the bases and emitters of the transistors to provide each of the emitters with an adjustable constant current, each of said transistors also having a collector electrode with the collector of one of the transistors connected to the voltage reference source and the collector of the other transistor connected to the capacitor to transmit changes in voltage potential of the reference source through the transistors to the capacitor at a rate determined by the current flow through said emitters.

3. The combination as recited in claim 2 wherein the capacitor is connected to the base of an additional emitter-follower connected transistor which is arranged to act as a current amplifier in response to changes in the output reference voltage signal.

4. In a time delay circuit, the combination comprising; a reference voltage source providing an input voltage signal for the circuit, a capacitor providing an output voltage signal for the circuit, at least one comomn base connected transistor having an emitter, base and collector with the base connected to have the input signal impressed thereon and the collector connected to have the output signal impressed thereon, a separate floating D.C. source connected in circuit with the base and emitter for providing the emitter with an adjustable constant current whereby an increase in potential in the input signal is transmitted to the capacitor by the transistor at a rate determined by the emitter current flow.

5. In a time delay circuit, the combination comprising; a reference voltage source providing an input voltage reference signal, a timing capacitor providing an output voltage signal, a common base connected transistor having; a base connected to have the input voltage signal of the reference source impressed thereon and a collector electrode connected to the capacitor, said transistor also having an emitter, a separate floating source connected between the emitter and base of the transistor arranged to provide the emitter electrode with a constant current whereby an increase in potential of the reference signal is transmitted to the capacitor through the transistor at a rate determined by the current flow through the emitter.

6. In a time delay circuit, the combination comprising; a reference voltage source providing an input signal for the circiut, a capacitor providing an output voltage signal for the circuit, a pair of common base connected transistors each having an emitter, a base and a collector, a separate floating D.C. source connected in circuit with the emitters and the bases of the transistors to provide the emitters of said transistors with a constant current, and circuit means connecting the input signal source, the capacitor, the bases and the collectors of said transistors in a circuit so any algebraic differences in potential between the input and output signals appears between the bases and collectors of the transistors for controlling the conduction of the transistors and changing the output voltage signal at a rate determined by the current flow through the emitters of the transistors in response to said algebraic difference.

7. In a time delay circuit, the combination comprising; a reference voltage source providing an input reference voltage signal for the circuit, a capacitor providing an output voltage signal for the circuit, at least one common base connected transistor having an emitter electrode, a base electrode and a collector electrode with the collector electrode connected to have the input voltage signal impressed thereon and the base electrode connected to have the voltage signal of the capacitor impressed thereon, and a separate floating source of D.C. current connected between the base and emitter electrodes arranged to provide the emitter electrode with a constant D.C. current whereby a decrease in potential of the input reference signal is transmitted to the capacitor through the transistor at a rate determined by the current flow through the emitter.

No references cited.